(12) United States Patent
Nakajima et al.

(10) Patent No.: US 8,871,825 B2
(45) Date of Patent: Oct. 28, 2014

(54) POLYPROPYLENE RESIN COMPOSITION, METHOD FOR PRODUCING THE SAME, AND FOAM MOLDED ARTICLE

(75) Inventors: Hiroyoshi Nakajima, Ichihara (JP); Yoshitaka Kobayashi, Ichihara (JP); Takashi Fujimoto, Shinagawa-ku (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 619 days.

(21) Appl. No.: 12/739,896

(22) PCT Filed: Oct. 30, 2008

(86) PCT No.: PCT/JP2008/070259
§ 371 (c)(1),
(2), (4) Date: Jul. 20, 2010

(87) PCT Pub. No.: WO2009/057825
PCT Pub. Date: May 7, 2009

(65) Prior Publication Data
US 2010/0298456 A1  Nov. 25, 2010

(30) Foreign Application Priority Data

Oct. 31, 2007 (JP) ................................ 2007-283093
Oct. 31, 2007 (JP) ................................ 2007-283095

(51) Int. Cl.
| C08L 53/00 | (2006.01) |
| C08J 9/00 | (2006.01) |
| C08L 23/10 | (2006.01) |
| C08L 23/08 | (2006.01) |
| C08K 3/30 | (2006.01) |
| C08L 23/16 | (2006.01) |
| C08K 7/02 | (2006.01) |

(52) U.S. Cl.
CPC . C08L 23/10 (2013.01); *C08K 3/30* (2013.01); C08J 9/0061 (2013.01); *C08J 2423/00* (2013.01); *C08L 2205/03* (2013.01); *C08L 2205/02* (2013.01); *C08L 23/16* (2013.01); C08L 23/0815 (2013.01); C08L 53/00 (2013.01); *C08K 7/02* (2013.01); *C08J 2353/00* (2013.01)
USPC ........... 521/134; 521/142; 521/143; 521/144; 525/190; 525/240; 525/242

(58) Field of Classification Search
CPC ..... C08L 23/0815; C08L 23/10; C08L 53/00; C08L 2205/02; C08L 2205/03; C08L 23/16; C08J 9/0061; C08J 2353/00; C08J 2423/00
USPC .......... 525/240, 242, 190; 521/134, 142, 143, 521/144

See application file for complete search history.

(56) References Cited

U.S. PATENT DOCUMENTS

| 4,472,485 A * | 9/1984 | Tabuse et al. ................. 428/516 |
| 5,723,527 A | 3/1998 | Sadatoshi et al. |
| 5,914,363 A | 6/1999 | Sadatoshi et al. |
| 2001/0020045 A1 | 9/2001 | Tsutsui et al. |
| 2004/0242773 A1 | 12/2004 | Satoh et al. |
| 2006/0135672 A1 * | 6/2006 | Kanzaki ........................ 524/451 |
| 2007/0208138 A1 * | 9/2007 | Tsunori et al. ................ 525/240 |

FOREIGN PATENT DOCUMENTS

| JP | 06-212007 A | 8/1994 |
| JP | 08-302107 A | 11/1996 |
| JP | 08-302108 A | 11/1996 |
| JP | 09-235403 A | 9/1997 |
| JP | 10-060144 A | 3/1998 |
| JP | 10-087919 A | 4/1998 |
| JP | 11-279369 A | 10/1999 |
| JP | 2001-316510 A | 11/2001 |
| JP | 2002-275325 A | 9/2002 |
| JP | 2004-307842 A | 11/2004 |

* cited by examiner

Primary Examiner — Irina S Zemel
(74) Attorney, Agent, or Firm — Sughrue Mion, PLLC

(57) ABSTRACT

There is provided a polypropylene resin composition comprising a propylene polymer (A) containing 0 to 70% by mass of a propylene homopolymer (A-1) and 30 to 100% by mass of a propylene-ethylene block copolymer (A-2) defined below, an ethylene-α-olefin copolymer (B) defined below, and an inorganic filler (C), wherein the proportion of the amount of the (A), the proportion of the amount of (B), and the proportion of the amount of (C) relative to the total amount of the (A), the (B) and the (C) are 40 to 94% by mass, 5 to 30% by mass, and 1 to 30% by mass, respectively, the propylene-ethylene block copolymer (A-2) is a mixture of a propylene homopolymer component and a propylene-ethylene random copolymer component, wherein the intrinsic viscosity, as measured in Tetralin of 135° C., of the propylene-ethylene random copolymer component is within the range of 2.0 to 8.0 dl/g, the ethylene-α-olefin copolymer (B) is a copolymer of ethylene and an α-olefin having 4 to 20 carbon atoms, the copolymer having a density of 0.85 to 0.89 g/cm³ and a melt flow rate, as measured at 190° C. under a 2.16 kg load in accordance with JIS K7210, of more than 10 g/10 min and not more than 40 g/10 min.

7 Claims, 1 Drawing Sheet

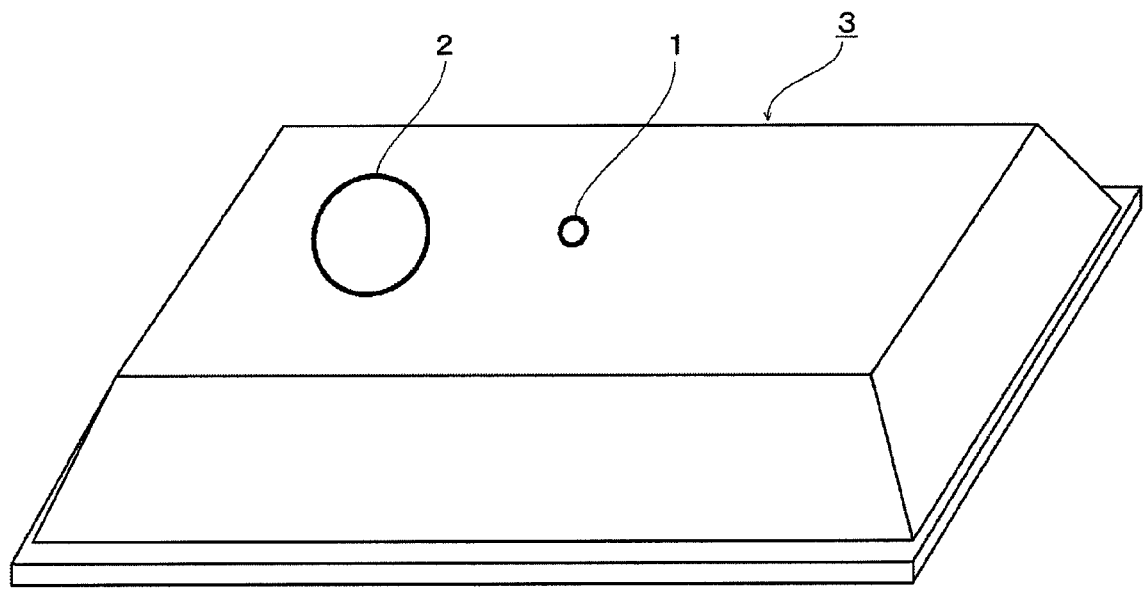

POLYPROPYLENE RESIN COMPOSITION, METHOD FOR PRODUCING THE SAME, AND FOAM MOLDED ARTICLE

CROSS REFERENCE TO RELATED APPLICATIONS

This application is a National Stage of International Application No. PCT/JP2008/070259 filed Oct. 30, 2008, claiming priority based on Japanese Patent Application Nos. JP 2007-283093 filed Oct. 31, 2007 and 2007-283095 filed Oct. 31, 2007, the contents of all of which are incorporated herein by reference in their entirety.

TECHNICAL FIELD

The present invention relates to a polypropylene resin composition, a method for producing the same, and a foam molded article.

BACKGROUND ART

Polypropylene has been used widely in a molding field because it is excellent in mechanical properties, chemical resistance, and so on and therefore it is very useful. Foam molded articles obtained by foam molding polypropylene have been used as cushioning materials in the automobile field, acoustic materials, draining materials for percolation, various types of fillers, and so on.

JP 10-87919 A discloses a polypropylene resin composition obtained by melt blending (A) 50 to 95 parts by weight of a polypropylene having a melt flow rate (ASTM D1238, 230° C., 2.16 kg load) of 10 to 100 g/10 min, (B) 3 to 45 parts by weight of a non-crystalline or low-crystalline α-olefin copolymer, (C) 2 to 45 parts by weight of an inorganic filler (the total amount of the components (A), (B), and (C) is 100 parts by weight), and (D) 0.005 to 0.2 parts by weight of an organic peroxide, wherein the polypropylene resin composition is characterized in that (i) the melt flow rate (ASTM D1238, 230° C., 2.16 kg load) is 50 to 150 g/10 min, (ii) the IZOD impact strength (with a notch; ASTM D 628) at 23° C. is 100 J/m or more, and (iii) the tensile elongation at break (ASTM D638) is 20% or more.

JP 11-279369 A discloses a polypropylene resin composition obtained by mixing (A) 50 to 100 parts by weight of a propylene-ethylene block copolymer having a melt flow rate of 0.1 to 80 g/10 min and an ethylene content of an amorphous portion thereof of 30% by weight or more, (B) 0 to 35 parts by weight, based on the component (A), of a rubbery polymer, (C) 0 to 35 parts by weight, based on the component (A), of an inorganic filler, and (D) 0.005 to 0.2 parts by weight, relative to 100 parts by weight in total of the components (A), (B), and (C), of an organic peroxide, and then subjecting them to melt-kneading treatment.

DISCLOSURE OF THE INVENTION

The problem which the present invention intends to solve is to provide a polypropylene resin composition which can afford a foam molded article with few silver streaks and a method of the production thereof, and eventually provide a foam molded article with few silver streaks.

In one aspect, the present invention is a polypropylene resin composition comprising a propylene polymer (A) containing 0 to 70% by mass of a propylene homopolymer (A-1) and 30 to 100% by mass of a propylene-ethylene block copolymer (A-2) defined below, an ethylene-α-olefin copolymer (B) defined below, and an inorganic filler (C), wherein the proportion of the amount of the (A), the proportion of the amount of (B), and the proportion of the amount of (C) relative to the total amount of the (A), the (B) and the (C) are 40 to 94% by mass, 5 to 30% by mass, and 1 to 30% by mass, respectively, the propylene-ethylene block copolymer (A-2) is a mixture of a propylene homopolymer component and a propylene-ethylene random copolymer component, wherein the intrinsic viscosity, as measured in Tetralin of 135° C., of the propylene-ethylene random copolymer component is within the range of 2.0 to 8.0 dl/g, the ethylene-α-olefin copolymer (B) is a copolymer of ethylene and an α-olefin having 4 to 20 carbon atoms, the copolymer having a density of 0.85 to 0.89 g/cm$^3$ and a melt flow rate, as measured at 190° C. under a 2.16 kg load, of more than 10 g/10 min and not more than 40 g/10 min.

In a second aspect, the present invention is a polypropylene resin composition obtained by heat treating a preliminary mixture comprising a propylene polymer (A) containing 0 to 70% by mass of a propylene homopolymer (A-1) and 30 to 100% by mass of a propylene-ethylene block copolymer (A-2), an ethylene-α-olefin copolymer (B), and an inorganic filler (C), wherein in the preliminary mixture the proportion of the amount of the (A), the proportion of the amount of (B), and the proportion of the amount of (C) relative to the total amount of the (A), the (B) and the (C) are 40 to 94% by mass, 5 to 30% by mass, and 1 to 30% by mass, respectively. In this composition, the propylene-ethylene block copolymer (A-2) and the ethylene-α-olefin copolymer (B) are the same in definition as those in the composition of the first aspect.

In a third aspect, the present invention is a method for producing the polypropylene resin composition of the first aspect comprising a first step of forming a preliminary mixture by feeding 40 to 94 parts by mass of the propylene polymer (A), 5 to 30 parts by mass of the ethylene-α-olefin copolymer (B), and 5 to 30 parts by mass of the inorganic filler (C) into a melt-kneading apparatus, provided that the total amount of the (A), the (B) and the (C) is adjusted to 100 parts by mass, and a second step of heat treating the preliminary mixture with the melt-kneading apparatus.

In a fourth aspect, the present invention is a foam molded article characterized by being formed of the polypropylene resin composition according to the first aspect.

BRIEF DESCRIPTION OF THE DRAWINGS

FIG. 1 is a schematic perspective view that illustrates an example of the foam molded articles of the present invention produced in Examples. Sign 1 represents an injection gate portion, sign 2 represents a circular area having a diameter of 60 mm (a portion in which silver streaks were evaluated), and sign 3 represents a foam molded article.

MODE FOR CARRYING OUT THE INVENTION

In the first aspect, the polypropylene resin composition of the present invention is characterized by containing a propylene polymer (A) containing 0 to 70% by mass of a propylene homopolymer (A-1) and 30 to 100% by mass of a propylene-ethylene block copolymer (A-2) defined below, an ethylene-α-olefin copolymer (B) defined below, and an inorganic filler (C), wherein the proportion of the amount of the (A), the proportion of the amount of (B), and the proportion of the amount of (C) relative to the total amount of the (A), the (B) and the (C) are 40 to 94% by mass, 5 to 30% by mass, and 1 to 30% by mass, respectively.

The propylene-ethylene block copolymer (A-2) is a mixture of a propylene homopolymer component and a propylene-ethylene random copolymer component, wherein the intrinsic viscosity, as measured in Tetralin of 135° C., of the propylene-ethylene random copolymer component is within the range of 2 to 8 dl/g.

The ethylene-α-olefin copolymer (B) has a density of 0.85 to 0.89 g/cm$^3$ and a melt flow rate (henceforth, referred to also as "MFR"), as measured at 190° C. under a 2.16 kg load in accordance with JIS K7210, of more than 10 g/10 min and not more than 40 g/10 min.

<Propylene Polymer (A)>

The polypropylene resin composition of the present invention contains a propylene polymer (A) containing 0 to 70% by mass of a propylene homopolymer (A-1) and 30 to 100% by mass of a propylene-ethylene block copolymer (A-2). The amount of the (A-1) and the amount of the (A-2) are each proportions relative to the total amount of the (A-1) and the (A-2).

As the propylene polymer (A), a propylene-α-olefin copolymer and/or a propylene-ethylene-α-olefin copolymer may also be used together with the propylene homopolymer (A-1) and the propylene-ethylene copolymer (A-2).

An example of the propylene-α-olefin copolymer which may be used together with the propylene homopolymer (A-1) and the propylene-ethylene copolymer (A-2) is a propylene-α-olefin random copolymer or a propylene-α-olefin block copolymer can be mentioned. The propylene-α-olefin block copolymer is a mixture composed of a propylene homopolymer component and a propylene-α-olefin random copolymer component.

As the propylene-ethylene-α-olefin copolymer which can be used together with the propylene homopolymer (A-1) and the propylene-ethylene copolymer (A-2), a propylene-ethylene-α-olefin random copolymer or a propylene-ethylene-α-olefin block copolymer can be mentioned.

The propylene-ethylene-α-olefin block copolymer is a polymeric mixture composed of a propylene homopolymer component and a propylene-ethylene-α-olefin random copolymer component. Examples of the α-olefin used in the propylene-α-olefin copolymer or the α-olefin in the propylene-ethylene-α-olefin copolymer include α-olefins having 4 to 20 carbon atoms, e.g., 1-butene, 1-pentene, 1-hexene, 1-octene, and 1-decene.

The total amount of the propylene homopolymer (A-1) and the propylene-ethylene block copolymer (A-2) preferably accounts for 50% by mass or more of the amount of the propylene polymer (A), more preferably accounts for 80% by mass or more, and even more preferably accounts for 100% by mass.

The propylene homopolymer (A-1) preferably has an isotactic pentad fraction, measured by $^{13}$C-NMR, of not less than 0.95, and more preferably not less than 0.98. The propylene homopolymer portion of the propylene-ethylene block copolymer (A-2) preferably has an isotactic pentad fraction, as measured by $^{13}$C-NMR, of 0.95 or more, and more preferably 0.98 or more.

The isotactic pentad fraction is a fraction of propylene monomer units which are present at the center of an isotactic chain in the form of a pentad unit in the polypropylene homopolymer molecular chain, in other words, a fraction of propylene monomer units present at the center of a chain in which five propylene monomer units are meso-bonded successively (this chain is henceforth referred to as mmmm) in the polypropylene molecular chain. The method for measuring the isotactic pentad fraction is the method disclosed by A. Zambelli et al. in Macromolecules 6, 925 (1973), namely, a method in which the measurement is performed by using $^{13}$C-NMR. NMR absorption peaks are assigned in accordance with the disclosure of Macromolecules, 8, 687 (1975).

Specifically, the isotactic pentad fraction is a ratio of the mmmm peak area to the total peak area in the methyl carbon ranges observed in a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

The intrinsic viscosity of the propylene homopolymer (A-1) measured in Tetralin solvent of 135° C. and the intrinsic viscosity of the propylene homopolymer component of the propylene-ethylene block copolymer (A-2) measured in Tetralin solvent of 135° C. are each preferably 0.6 to 5.0 dl/g, more preferably 0.7 to 4.0 dl/g, and even more preferably 0.8 to 2.0 dl/g.

From the viewpoint of the minuteness of cells to be formed by foam molding, the intrinsic viscosity of the propylene-ethylene random copolymer component contained in the propylene-ethylene block copolymer (A-2) measured in Tetralin solvent of 135° C. (henceforth, referred to also as $[\eta]_{EP}$) is preferably 2.0 to 8.0 dl/g, and more preferably 2.5 to 6.0 dl/g.

From the viewpoint of inhibition of generation of silver streaks in foam molding, the molecular weight distribution (this may be expressed as Q value or Mw/Mn), measured by gel permeation chromatography (GPC), of the propylene homopolymer (A-1) and that of the propylene homopolymer component of the propylene-ethylene block copolymer (A-2) are each preferably 3 to 7.

From the viewpoint of inhibition of generation of silver streaks in foam molding, the ethylene content of the propylene-ethylene random copolymer component of the propylene-ethylene block copolymer (A-2) is preferably 20 to 65% by mass, more preferably 25 to 50% by mass, and even more preferably 30 to 45% by mass.

The content of the propylene-ethylene random copolymer component of the propylene-ethylene block copolymer (A-2) is preferably 10 to 60% by mass, more preferably 10 to 40% by mass, and even more preferably 10 to 25% by mass.

The MFR of the propylene homopolymer (A-1), as measured at 230° C. under a 2.16 kg load in accordance with JIS K7210, is preferably 0.1 to 400 g/10 min, and more preferably 1 to 300 g/10 min.

The MFR of the propylene-ethylene block copolymer (A-2), as measured at 230° C. under a 2.16 kg load in accordance with JIS K7210, is preferably 0.1 to 200 g/10 min, more preferably 5 to 150 g/10 min, and even more preferably 30 to 130 g/10 min.

From the viewpoint of foam molding property, the MFR, as measured at 230° C. under a 2.16 kg load in accordance with JIS K7210, of the propylene homopolymer (A) is preferably 0.1 to 200 g/10 min, and more preferably 5 to 150 g/10 min.

In the polypropylene resin composition of the present invention, the proportion of the amount of the propylene polymer (A) relative to the total amount of the propylene polymer (A), the ethylene-α-olefin copolymer (B), and the inorganic filler (C) is 40 to 94% by mass, preferably 40 to 80% by mass, and more preferably 40 to 75% by mass. If the content of the propylene polymer (A) is less than 40% by mass, a foam molded article may be poor in rigidity. Moreover, if the content of the propylene polymer (A) exceeds 94% by mass, a foam molded article may be poor in impact resistance.

From the viewpoint of the balance of mechanical properties, the compounding ratio (mass ratio) of the propylene homopolymer (A-1) to the propylene-ethylene block copolymer (A-2) contained in the propylene polymer (A), i.e., propylene homopolymer (A-1):propylene-ethylene block copolymer (A-2) is 0:100 to 70:30, preferably 0:100 to 50:50, and even more preferably 8:92 to 40:60.

The propylene homopolymer (A-1) and the propylene-ethylene block copolymer (A-2) which are used as the propylene polymer (A) can be produced by a conventional polymerization method using a conventional polymerization catalyst. Examples of such a polymerization catalyst to be used in the preparation of the propylene polymer (A) include catalyst systems composed of (1) a solid catalyst component containing magnesium, titanium, halogen and an electron donor as essential components, (2) an organoaluminum compound and (3) an electron donating component. This catalyst can be prepared by, for example, the methods disclosed in JP 1-319508 A, JP 7-216017 A, and JP 10-212319 A.

Examples of the polymerization method to be used in the preparation of the propylene homopolymer (A-1) or the preparation of the propylene-ethylene block copolymer (A-2) include bulk polymerization, solution polymerization, slurry polymerization and vapor phase polymerization. Such polymerization methods may be conducted either in a batch system or in a continuous system and may be combined appropriately.

The method for producing the propylene-ethylene block copolymer (A-2) preferably is a method that is performed by using a polymerization apparatus including at least two polymerization vessels arranged in series, in which method, in the presence of the aforementioned catalyst system composed of (1) the solid catalyst component, (2) the organoaluminum compound and (3) the electron donating component, a propylene homopolymer is produced by homopolymerizing propylene in a polymerization vessel, then the propylene homopolymer produced is transferred to the next polymerization vessel, and subsequently a propylene-ethylene random copolymer component is formed by copolymerizing propylene and ethylene in the presence of the propylene homopolymer.

The amounts of (1) the solid catalyst component, (2) the organoaluminum compound and (3) the electron donating component used in the polymerization method and the method for feeding the catalyst components into polymerization reactors may be determined appropriately.

The polymerization temperature preferably is –30 to 300° C., and more preferably is 20 to 180° C. The polymerization pressure preferably is normal pressure to 10 MPa, and more preferably is 0.2 to 5.0 MPa. As a molecular weight regulator, hydrogen may be used, for example.

In the production of the propylene homopolymer (A-1) or the production of the propylene-ethylene block copolymer (A-2), preliminary polymerization may be conducted prior to main polymerization. One example of methods of preliminary polymerization is a method in which pre-polymerization is carried out in a slurry state using a solvent while feeding a small amount of propylene in the presence of (1) a solid catalyst component and (2) an organoaluminum compound.

<Ethylene-α-Olefin Copolymer (B)>

The polypropylene resin composition of the present invention contains an ethylene-α-olefin copolymer (B); the ethylene-α-olefin copolymer (B) is a copolymer of ethylene and an α-olefin having 4 to 20 carbon atoms which has a density of 0.85 to 0.89 g/cm³ and a melt flow rate, as measured at 190° C. under a 2.16 kg load in accordance with JIS K7210, of more than 10 g/10 min and not more than 40 g/10 min.

The polypropylene resin composition of the present invention may contain one kind of ethylene-α-olefin copolymer or may contain two or more kinds of ethylene-α-olefin copolymers as the ethylene-α-olefin copolymer (B).

The α-olefins to be used for the ethylene-α-olefin copolymer (B) includes include α-olefins having 4 to 20 carbon atoms, and examples thereof include 1-butene, 1-pentene, 1-hexene, 4-methyl-1-pentene, 1-heptene, 1-octene, 1-decene, 1-dodecene, 1-tetradecene, 1-hexadecene, and 1-eicocene. Such α-olefins may be used singly or in combination. Preferable α-olefins include α-olefins having from 4 to 12 carbon atoms, such as 1-butene, 1-hexene and 1-octene.

The ethylene-α-olefin copolymer (B) can produced by polymerizing prescribed monomers by slurry polymerization, solution polymerization, bulk polymerization, vapor phase polymerization, or the like using a metallocene catalyst.

Examples of such a metallocene catalyst include the metallocene catalysts disclosed in JP 3-163088 A, JP 4-268307 A, JP 9-12790 A, JP 9-87313, JP 11-80233 A, and WO 96/13529.

A preferable example of the method for producing the ethylene-α-olefin copolymer (B) using a metallocene catalyst is the method disclosed in EP 1211287 A.

In the polypropylene resin composition of the present invention, the proportion of the amount of the ethylene-α-olefin copolymer (B) relative to the total amount of the propylene polymer (A), the ethylene-α-olefin copolymer (B), and the inorganic filler (C) is 5 to 30% by mass, and preferably 10 to 30% by mass.

If the content of the ethylene-α-olefin copolymer (B) is less than 5% by mass, a foam molded article may be poor in impact resistance. If the content of the ethylene-α-olefin copolymer (B) exceeds 30% by mass, the foam molding property may be poor.

From the viewpoint of inhibition of generation of silver streaks in the production of a foam molded article, the ethylene-α-olefin copolymer (B) preferably accounts for 30 to 100% by mass of the total amount of the ethylene-α-olefin copolymer contained in the polypropylene resin composition, and more preferably accounts for 50 to 100% by mass.

The ethylene content of the ethylene-α-olefin copolymer (B) is preferably from 20 to 95% by mass, and more preferably from 30 to 90% by mass. The α-olefin content is preferably from 5 to 80% by mass, and more preferably from 10 to 70% by mass.

The density of the ethylene-α-olefin copolymer (B) is 0.85 to 0.89 g/cm³, preferably 0.85 to 0.88 g/cm³, and more preferably 0.86 to 0.88 g/cm³. If the density is less than 0.85 g/cm³, the foam molding property may be poor. If it exceeds 0.89 g/cm³, the uniformity and the minuteness of foamed cells may be poor. Moreover, it is difficult to simultaneously attain good foam molding property and effective inhibition of silver streaks.

The melt flow rate, as measured at 190° C. under a 2.16 kg load in accordance with JIS K7210, of the ethylene-α-olefin copolymer (B) is more than 10 g/10 min and not more than 40 g/10 min, preferably more than 10 g/10 min, and preferably 35 g/10 min. If the melt flow rate is 10 g/10 min or less, silver streaks may be formed in a foam molded article.

<Inorganic Filler (C)>

The polypropylene resin composition of the present invention contains an inorganic filler (C).

The inorganic filler (C) is not particularly restricted and specific examples thereof include particulate fillers, such as glass beads, calcium carbonate, and barium sulfate, plate-like fillers, such as kaolin, glass flakes, talc, laminar silicates (bentonite, montmorillonite, smectite), and mica, and fibrous fillers, such as fibers and whiskers. By incorporating a plate-like filler, a foam molded article excellent in flexural modulus is obtained. Talc is inexpensive and therefore is preferable.

The average particle diameter of the inorganic filler (C) is preferably 0.01 to 50 μm, more preferably 0.1 to 30 μm, and even more preferably 0.1 to 5 μm. The average particle diameter of the inorganic filler (C) means a 50% equivalent particle diameter $D_{50}$ which is determined from an integral distribution curve of the sub-sieve method which is produced by measuring a suspension of the inorganic filler (C) in a dispersing medium, such as water and alcohol, by means of a centrifugal sedimentation type particle size distribution analyzer.

Fibrous inorganic fillers are preferably used because of their excellence in reinforcing performance. Examples of fibers to be used as a fibrous inorganic filler include glass fibers and metal fibers. Examples of the substance forming a whisker to be used as a fibrous inorganic filler include metals and inorganic compounds such as metal oxides and metal nitrides, and specifically carbon, potassium titanate, sepiolite, wollastonite, allophane, imogolite, magnesium oxysulfate, aluminum, nickel, copper, calcium carbonate, potassium aluminate titanate, titanium dioxide, calcium silicate, aluminum borate, magnesium borate, nickel borate, alumina, and silicon nitride.

As a fibrous inorganic filler, a whisker is preferable, and fibrous magnesium oxysulfate is particularly preferable because the specific gravity of the fibrous filler itself is low and a molded article excellent in rigidity and appearance can be obtained. One example of the fibrous magnesium oxysulfate is MOS HIGE (registered trademark) produced by Ube Material Industries, Ltd.

A fibrous inorganic filler preferably has an average fiber length, as measured by electron microscopic observation, of 5 μm or more, more preferably 5 to 30 μm, and even more preferably 10 to 20 μm. The average fiber diameter is preferably 0.2 to 1.5 μm, and more preferably 0.3 to 1.0 μm. The average aspect ratio of a fibrous inorganic filler is preferably 10 or more, more preferably 10 to 30, and even more preferably 12 to 25.

It is more preferable from the viewpoint of the effect of improving rigidity and inhibition of generation of silver streaks in a molded article that the average fiber diameter be 0.3 to 1.0 μm, the average fiber length be 7 to 15 μm, and the average aspect ratio be 12 to 25.

The average fiber diameter, the average fiber length, and the average aspect ratio of a fibrous inorganic filler can be determined by randomly selecting 50 or more fibrous fillers in an image resulting from a scanning electron microscope (SEM) observation, subsequently measuring fiber diameters, fiber lengths or aspect ratios, and then calculating an average. The aspect ratio is the ratio of the fiber length to the fiber diameter.

The inorganic filler (C) may be used before being processed or alternatively, for the purpose of improving the interfacial adhesion strength to a polypropylene resin composition or improving the dispersibility of the inorganic filler in a polypropylene resin composition, may be used after treating the surface of the inorganic filler with conventional silane coupling agents, titanium coupling agents, higher fatty acids, higher fatty acid esters, higher fatty acid amides, higher fatty acid salts or other surfactants.

The inorganic filler (C) may be used in the form of a masterbatch by melt-kneading it with the propylene polymer (A) and/or the ethylene-α-olefin copolymer (B) in advance.

In the polypropylene resin composition of the present invention, the proportion of the amount of the inorganic filler (C) relative to the total amount of the propylene polymer (A), the ethylene-α-olefin copolymer (B), and the inorganic filler (C) is 1 to 30% by mass, preferably 1 to 25% by mass, and more preferably 1 to 20% by mass.

If the content of the inorganic filler (C) is less than 1% by mass, a foam molded article may be poor in rigidity. Moreover, if the content of the inorganic filler (C) exceeds 30% by mass, a foam molded article may be poor in impact resistance.

In the second aspect, the present invention is a polypropylene resin composition obtained by heat treating a preliminary mixture comprising a propylene polymer (A) containing 0 to 70% by mass of a propylene homopolymer (A-1) and 30 to 100% by mass of a propylene-ethylene block copolymer (A-2), an ethylene-α-olefin copolymer (B), and an inorganic filler (C), wherein in the preliminary mixture the proportion of the amount of the (A), the proportion of the amount of (B), and the proportion of the amount of (C) relative to the total amount of the (A), the (B) and the (C) are 40 to 94% by mass, 5 to 30% by mass, and 1 to 30% by mass, respectively. In this composition, the details and the definitions of the components (A-1), (A-2), (A), (B), and (C) are the same as those in the composition of the first aspect.

<Organic Peroxide (D)>

The polypropylene resin composition according to the second aspect of the present invention may be one obtained by heat-treating a preliminary mixture further containing an organic peroxide (D) in an amount of up to 2 parts by mass relative to 100 parts by mass of the total amount of the (A), the (B) and the (C).

The organic peroxide (D) may be selected from conventional organic peroxides and its examples include an organic peroxide which has a decomposition temperature of lower than 120° C. at which the half life of the organic peroxide is one minute and an organic peroxide which has a decomposition temperature of 120° C. or higher at which the half life of the organic peroxide is one minute.

Examples of the organic peroxide which has a decomposition temperature of lower than 120° C. at which the half life of the organic peroxide is one minute include diacylperoxide compounds and percarbonate compounds (compounds (I) having a structure represented by the following structural formula (1) in the molecular skeleton) and alkyl perester compounds (compounds (II) having a structure represented by the following structural formula (2) in the molecular skeleton).

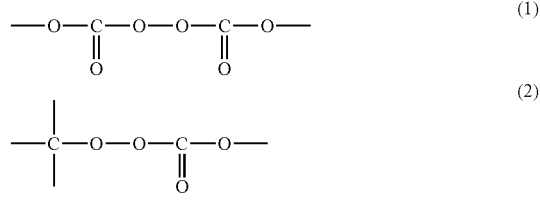

Examples of the compound (I) having the structure represented by the formula (1) include di-3-methoxybutyl peroxydicarbonate, di-2-ethylhexyl peroxydicarbonate, bis(4-tert-butylcyclohexyl) peroxydicarbonate, diisopropyl peroxydicarbonate, tert-butylperoxyisopropyl carbonate and dimyristyl peroxycarbonate.

Examples of the compounds (II) having the structure represented by the formula (2) include 1,1,3,3-tetramethylbutyl neodecanoate, α-cumylperoxy neodecanoate and tert-butylperoxy neodecanoate.

Examples of the organic peroxide which has a decomposition temperature of 120° C. or higher at which the half life of the organic peroxide is one minute include 1,1-bis(tert-butylperoxy)cyclohexane, 2,2-bis(4,4-di-tert-butylperoxycyclohexyl)propane, 1,1-bis(tert-butylperoxy)cyclododecane, tert-hexylperoxyisopropyl monocarbonate, tert-butylperoxy-3,5,5-trimethyl hexonoate, tert-butyl peroxylaurate, 2,5-dimethyl-2,5-di-(benzoylperoxy)hexane, tert-butyl peroxyacetate, 2,2-bis(tert-butylperoxy)butene, tert-butyl peroxybenzoate, n-butyl-4,4-bis(tert-butylperoxy)valerate, di-tert-butyl peroxyisophthalate, dicumyl peroxide, α,α'-bis(tert-butylperoxy-m-isopropyl)benzene, 2,5-dimethyl-2,5-di-(tert-butylperoxy)hexane, 1,3-bis(tert-butylperoxyisopropyl)benzene, tert-butyl cumyl peroxide, di-tert-butyl peroxide, p-menthane hydroperoxide and 2,5-dimethyl-2,5-di-(tert-butylperoxy)hexyne-3.

From the viewpoint of foam molding property, the used amount of the organic peroxide (D) is preferably up to 2 parts by mass, more preferably 0.002 to 1 part by mass, and even more preferably 0.005 to 0.5 parts by mass relative to 100 parts by mass of the total amount of the (A), the (B), and the (C). In the present invention, an embodiment in which a preliminary mixture containing no organic peroxide (D) is heat-treated also preferred.

<Additives>

The polypropylene resin composition of the present invention may contain additives and examples of such additives include neutralizing agents, antioxidants, light-resisting agents, UV absorbers, copper inhibitors, lubricants, processing aids, plasticizers, dispersing agents, antiblocking agents, antistatic agents, nucleating agents, flame retardants, foam inhibitors, crosslinking agents, and colorants such as pigments.

<Melt Flow Rate of a Polypropylene Resin Composition>

From the viewpoint of effective inhibition of generation of silver streaks, the melt flow rate of the polypropylene resin composition of the present invention measured at 230° C. under a 2.16 kg load in accordance with JIS K7210 is preferably 50 to 150 g/10 min and more preferably 50 to 120 g/10 min. The MFR of the polypropylene resin composition can be controlled by appropriately determining the MFR of the propylene polymer (A) or the propylene-ethylene block copolymer (B) to be used for the preparation of the composition, or by using an appropriate amount of the organic peroxide (D) in the preparation of the composition.

<Method for Producing a Polypropylene Resin Composition>

The polypropylene resin composition of the present invention can be produced by a method having a first step of forming a preliminary mixture by feeding 40 to 94 parts by mass of the propylene polymer (A), 5 to 30 parts by mass of the ethylene-α-olefin copolymer (B), and 5 to 30 parts by mass of the inorganic filler (C) into a melt-kneading apparatus, provided that the total amount of the (A), the (B) and the (C) is adjusted to 100 parts by mass, and a second step of heat treating the preliminary mixture with the melt-kneading apparatus.

If necessary, up to 2 parts by mass, relative to 100 parts by mass of the total amount of the (A), the (B) and (C), of an organic peroxide (D) may further be fed in the first step. For example, the organic peroxide (D) may be mixed with the propylene polymer (A), the ethylene-α-olefin copolymer (B), and the inorganic filler (C) and be fed together to a melt-kneading apparatus.

The heat treatment of the preliminary mixture containing the propylene polymer (A), the ethylene-α-olefin copolymer (B), and the inorganic filler (C) can be carried out by kneading the components with a melt-kneading apparatus.

Examples of the melt-kneading apparatus to be used for the kneading include a single screw extruder, a twin screw extruder, a Banbury mixer, and a hot roll.

The kneading temperature is preferably 170 to 250° C. and the kneading time is preferably 20 seconds to 20 minutes. The kneading may be performed either after adding all the components simultaneously or while adding the components successively. For example, it is preferable to preliminarily mixing prescribed amounts of components with a tumbler uniformly and melt-kneading the resulting preliminary mixture.

<Foam Molded Article>

The foam molded article of the present invention is a molded article formed of the polypropylene resin composition of the present invention.

The foam molded article of the present invention is obtained by foam molding a polypropylene resin composition of the present invention to which an appropriate amount of a foaming agent has been added.

The foaming agent to be used for the present invention is not particularly restricted and conventional chemical foaming agents and conventional physical foaming agents can be used. The amount of the foaming agent added to the polypropylene resin composition to be subjected to foam molding is preferably 0.1 to 10 parts by mass, and more preferably 0.2 to 8 parts by mass relative to 100 parts by mass of the polypropylene resin composition.

The chemical foaming agent may be either an inorganic compound or an organic compound, and two or more compounds may be used together. Examples of the inorganic compound include hydrogen carbonates, such as sodium hydrogen carbonate. Examples of the organic compound include polycarboxylic acids, such as citric acid, and azo compounds, such as azodicarbonamide (ADCA).

Examples of the physical foaming agent include inert gas, such as nitrogen and carbon dioxide, and volatile organic compounds. In particular, it is preferable to use supercritical carbon dioxide, supercritical nitrogen, or a mixture thereof. Two or more kinds of physical foaming agents may be used together, and a chemical foaming agent and a physical foaming agent may be used in combination.

In use of a physical foaming agent, it is preferable to mix the physical foaming agent in a supercritical state with a polypropylene resin composition in a molten state. Since a physical foaming agent in a supercritical state is high in solubility in a resin and can be diffused uniformly in a molten polypropylene resin composition in a short time, it is possible to obtain a foam molded article having a high expansion ratio and having a uniform foamed cell structure.

The step of mixing a physical foaming agent to a polypropylene resin composition in a molten state may be a step of pouring a physical foaming agent into a nozzle or a cylinder of an injection molding apparatus.

Specific examples of the method for foam molding the polypropylene resin composition of the present invention include conventional methods such as an injection foam molding, press foam molding, extrusion foam molding and stampable foam molding.

The foam molded article of the present invention can be converted into a decorated foam molded article by being combined with a skin material by insert molding, adhering or the like. Conventional skin materials can be used as the aforesaid skin material.

Specific examples of skin materials include woven fabric, non-woven fabric, knitted fabric, and film and sheet of thermoplastic resin or thermoplastic elastomer. Moreover, composite skin materials obtained by laminating sheets of polyurethane, rubber, thermoplastic elastomer or the like to skin materials such as those mentioned above may also be used.

Skin materials may further be provided with a cushion layer. Examples of the material which constitutes such a cushion layer include polyurethane foam, foam of EVA (ethylene-vinyl acetate copolymer), polypropylene foam and polyethylene foam.

<Applications of Foam Molded Article>

Applications of the foam molded article of the present invention include automotive components such as automotive interior components and exterior components, motorcycle components, components of furniture, electric appliances, and so on. Particularly, automotive component applications are preferable and automotive interior component applications are more preferable.

Examples of the automotive interior components include instrument panels, trims, door panels, side protectors, console boxes, and column covers. Examples of the automotive exterior components include bumpers, fenders, and wheel covers. Examples of the motorcycle components include cowlings, and muffler covers.

EXAMPLES

The present invention is described in more detail below with reference to Examples and Comparative Examples, but the invention is not limited thereto.

In the Examples or Comparative Examples, the resins and additives shown below were used.

(1) Propylene Homopolymer (A-1)

This polymer was produced by a solvent polymerization method using a solid catalyst component prepared according to the method for producing a catalyst for α-olefin polymerization disclosed in JP 10-212319 A.

MFR: 300 g/10 min (2) Propylene-Ethylene Block Copolymer (A-2)

(2-1) Propylene-Ethylene Block Copolymer (A-2)a

This polymer was produced by a solvent polymerization method using a solid catalyst component prepared according to the method for producing a catalyst for α-olefin polymerization disclosed in JP 10-212319 A.

MFR: 130 g/10 min

Intrinsic viscosity of the entire portion of the propylene-ethylene block copolymer, $[\eta]_T$: 1.4 dl/g Intrinsic viscosity of the propylene homopolymer component, $[\eta]_P$: 0.8 dl/g Ratio of the propylene-ethylene random copolymer portion to the entire portion of the copolymer, X: 12% by mass Intrinsic viscosity of the propylene-ethylene random copolymer component, $[\eta]_{EP}$: 6.0 dl/g Ethylene unit content of the propylene-ethylene random copolymer component: 30% by mass (2-2) Propylene-Ethylene Block Copolymer (A-2)b This polymer was produced by a vapor phase polymerization method using a solid catalyst component prepared according to the method for producing a solid catalyst component for α-olefin polymerization disclosed in JP 2004-182876 A.

MFR: 60 g/10 min

Intrinsic viscosity of the entire portion of the propylene-ethylene block copolymer, $[\eta]_T$: 1.55 dl/g Intrinsic viscosity of the propylene homopolymer component, $[\eta]_P$: 0.89 dl/g Ratio of the propylene-ethylene random copolymer component to the entire portion of the copolymer, X: 13% by mass Intrinsic viscosity of the propylene-ethylene random copolymer component, $[\eta]_{EP}$: 6.0 dl/g Ethylene unit content of the propylene-ethylene random copolymer component: 32% by mass (2-3) Propylene-Ethylene Block Copolymer (A-2)c This polymer was produced by a vapor phase polymerization method using a solid catalyst component prepared according to the method for producing a solid catalyst component for α-olefin polymerization disclosed in JP 2004-182876 A.

MFR: 32 g/10 min

Intrinsic viscosity of the entire portion of the propylene-ethylene block copolymer, $[\eta]_T$: 1.64 dl/g Intrinsic viscosity of the propylene homopolymer component, $[\eta]_P$: 1.00 dl/g Ratio of the propylene-ethylene random copolymer component to the entire portion of the copolymer, X: 16% by mass Intrinsic viscosity of the propylene-ethylene random copolymer component, $[\eta]_{EP}$: 5.0 dl/g Ethylene unit content of the propylene-ethylene random copolymer component: 34.5% by mass (2-4) Propylene-Ethylene Block Copolymer (A-2)d This polymer was produced by a vapor phase polymerization method using a solid catalyst component prepared according to the method for producing a solid catalyst component for α-olefin polymerization disclosed in JP 2004-182876 A.

MFR: 30 g/10 min

Intrinsic viscosity of the entire portion of the propylene-ethylene block copolymer, $[\eta]_T$: 1.42 dl/g Intrinsic viscosity of the propylene homopolymer component, $[\eta]_P$: 1.06 dl/g Ratio of the propylene-ethylene random copolymer component to the entire portion of the copolymer, X: 20.5% by mass Intrinsic viscosity of the propylene-ethylene random copolymer component, $[\eta]_{EP}$: 2.8 dl/g Ethylene unit content of the propylene-ethylene random copolymer component: 37% by mass (2-5) Propylene-Ethylene Block Copolymer (A-2)e This polymer was produced by a solvent polymerization method using the solid catalyst component disclosed in JP 7-216017 A.

MFR: 30 g/10 min

Intrinsic viscosity of the entire portion of the propylene-ethylene block copolymer, $[\eta]_T$: 1.5 dl/g Intrinsic viscosity of the propylene homopolymer component, $[\eta]_P$: 1.05 dl/g Ratio of the propylene-ethylene random copolymer component to the entire portion of the copolymer, X: 16% by mass Intrinsic viscosity of the propylene-ethylene random copolymer component, $[\eta]_{EP}$: 4.0 dl/g Ethylene unit content of the propylene-ethylene random copolymer component: 45% by mass (3) Ethylene-α-Olefin Copolymer (B)

(B-1) Ethylene-Butene Copolymer Rubber

Commercial name: CX5505 (produced by Sumitomo Chemical Co., Ltd.)

Density: 0.878 g/cm$^3$

MFR (190° C., 2.16 kg load): 14 g/10 min (B-2) Ethylene-Butene Copolymer Rubber

Commercial name: A35050 (produced by Mitsui Chemicals, Inc.)

Density: 0.863 g/cm$^3$

MFR (190° C., 2.16 kg load): 35 g/10 min (B-3) Ethylene-Octene Copolymer Rubber

Commercial name: TAFMER A0250S (produced by Mitsui Chemicals, Inc.)

Density: 0.860 g/cm$^3$

MFR (190° C., 2.16 kg load): 0.2 g/10 min (B-4) Ethylene-Butene Copolymer Rubber
Commercial name: VL800 (produced by Sumitomo Chemical Co., Ltd.)
Density: 0.905 g/cm$^3$
MFR (190° C., 2.16 kg load): 20 g/10 min
(B-5) Ethylene-Octene Copolymer Rubber
Commercial name: ENGAGE 8842 (produced by The Dow Chemical Co.)
Density: 0.858 g/cm$^3$
MFR (190° C., 2.16 kg load): 1 g/10 min
(4) Inorganic Filler (C)
(C-1) Commercial name: JR-63, produced by Kamitalc Co., Ltd.
Particle diameter: 1.8 µm
(C-2) Commercial name: JR-46, produced by Hayashi Chemical Co., Ltd.
Particle diameter: 2.7 µm
Talc content: 70% by mass
(C-3) Commercial name: MOS HIGE A, produced by Ube Material Industries, Ltd.
Average fiber diameter: 0.5 µm
Average fiber length: 10 µm
Average aspect ratio: 20
(5) Inorganic Filler Masterbatch (C')
(5-1) Talc Masterbatch (C'-2)
Propylene-ethylene block copolymer (A-2)e-based talc masterbatch talc masterbatch (C'-2)
(5-2) Fibrous Magnesium Oxysulfate Masterbatch (C'-3)
A masterbatch (C'-3) having a MOS HIGE A content of 50% by mass was obtained by mixing and melt-kneading 100 parts by mass of a propylene homopolymer (A–1) and 100 parts by mass of MOS HIGE (registered trademark) A (C-3) produced by Ube Material Industries, Ltd.
(6) Organic Peroxide (D)
(D-1)
Commercial name: Perkadox 14R-P, produced by Kayaku Akzo Corp. (Bis(tert-butyldioxy isopropyl)benzene)
(D-2)
Commercial name: PERHEXA 25B, produced by NOF Corp. (2,5-Dimethyl-2,5-di-(tert-butylperoxy)hexane)

Examples 1 to 11, Comparative Examples 1 to 4

Prescribed amounts of the components given in Table 1 were preliminarily mixed with a tumbler uniformly. Then, the obtained preliminary mixture was kneaded by using a twin screw kneading extruder (TEX44SS 30BW-2V, manufactured by The Japan Steel Works, Ltd.) at a screw rotation speed of 300 rpm and a temperature of 200° C. under vent suction, and the obtained kneadate was extruded at an extrusion rate of 30 to 50 kg/hr. Thus, polypropylene resin composition pellets were produced.

Using the pellets, injection foam molding was conducted by the use of an injection molding machine ES2550/400HL-MuCell (clamping force=400 tons) manufactured by ENGEL. Nitrogen in a supercritical state was used as a foaming agent.

For the injection molding was used a mold with a cavity having a shape corresponding to a molded article whose schematic perspective view is shown in FIG. 1 and whose approximate dimensions are 290 mm×370 mm×45 mm (height). The basic cavity clearance (initial board thickness) of the cavity in its mold-closed state was 1.5 mm (locally 1.6 mm), and the gate structure of the mold was a direct gate.

The cylinder temperature and the mold temperature were set to 250° C. and 50° C., respectively. After closing the mold, injection of the polypropylene resin composition containing the foaming agent was started. After completely injection-filling the mold cavity with the polypropylene resin composition, a cavity surface of a movable mold was retracted by 2.0 mm to enlarge the cavity volume, thereby foaming the polypropylene resin composition. The foamed polypropylene resin composition was cooled to solidify completely, yielding a foam molded article, whose condition was evaluated at its part 100 mm away from the injection gate.

The results were shown in Table 1.

The methods for measuring physical properties of the resin components and the polypropylene resin compositions used in the Examples and the Comparative Examples are described below.

(1) Melt Flow Rate (MFR)
Measurement was conducted in accordance with the method provided in JIS K7210. MFR was measured in accordance with the method provided in JIS K7210 at a measurement temperature of 230° C. and a 2.16 kg load, unless otherwise stated.

(2) Structural Analysis of Propylene-Ethylene Block Copolymer (2-1) Intrinsic Viscosity of Propylene-Ethylene Block Copolymer (2-1-a) Intrinsic Viscosity of Propylene Homopolymer Portion: $[\eta]_P$ In the production of a propylene-ethylene block copolymer, a propylene homopolymer was taken out from a polymerization vessel after the first step, i.e., the production of the propylene homopolymer. The intrinsic viscosity of the propylene homopolymer taken out was measured and it was represented by $[\eta]_P$.

(2-1-b) Intrinsic Viscosity of Propylene-Ethylene Random Copolymer Portion: $[\eta]_{EP}$ The intrinsic viscosity $[\eta]_P$ of the propylene homopolymer component and the intrinsic viscosity $[\eta]_T$ of the entire portion of the propylene-ethylene block copolymer were measured, and then the intrinsic viscosity $[\eta]_{EP}$ of the propylene-ethylene random copolymer component of the propylene-ethylene block copolymer was calculated from the following formula using the mass ratio X of the propylene-ethylene random copolymer component to the entire portion of the propylene-ethylene block copolymer.

$$[\eta]_{EP}=[\eta]_T/X-\{(1/X)-1\}[\eta]_P$$

$[\eta]_P$: Intrinsic viscosity (dl/g) of the propylene homopolymer portion
$[\eta]_T$: Intrinsic viscosity (dl/g) of the entire portion of the propylene-ethylene block copolymer (2-2) Mass Ratio of a Propylene-Ethylene Random Copolymer Component to the Entire Portion of a Propylene-Ethylene Block Copolymer: X The mass ratio X to the propylene-ethylene random copolymer portion to the entire portion of a propylene-ethylene-block copolymer was determined by measuring the heat of crystal fusion of the propylene homopolymer portion and that of the entire portion of the propylene-ethylene block copolymer, respectively, followed by calculation using the following formula. The heat of crystal fusion was measured by differential scanning calorimetry (DSC).

$$X=1-(\Delta Hf)_T/(\Delta Hf)_P$$

$(\Delta Hf)_T$: heat of fusion (cal/g) of the propylene-ethylene block copolymer
$(\Delta Hf)_P$: Heat of fusion (cal/g) of the propylene homopolymer component (2-3) Ethylene content $(C2')_{EP}$ of a propylene-ethylene random copolymer component in a propylene-ethylene block copolymer The ethylene content $(C2')_{EP}$ of the propylene-ethylene random copolymer portion of a propylene-ethylene block copolymer was determined by measuring the ethylene content $(C2')_T$ of the entire portion of the propylene-ethylene block copolymer by the infrared absorption spectrum method, followed by a calculation using the following formula.

$$(C2')_{EP}=(C2')_T/X$$

$(C2')_T$: Ethylene content of the entire portion of the propylene-ethylene block copolymer (% by mass)
$(C2')_{EP}$: Ethylene content of the propylene-ethylene random copolymer component (% by mass).
X: Mass ratio of the propylene-ethylene random copolymer component to the entire portion of the propylene-ethylene block copolymer (3) Measurement of Specific Gravity Measurement was conducted in accordance with the method provided in JIS K7112.
Measurement by an immersion method was performed at 23° C.

(4) Measurement of Flexural Modulus

A flexural modulus of a polypropylene resin composition was measured in accordance with the method provided in JIS K7171 using the polypropylene resin composition which had not been foamed. For the measurement was used a specimen molded by injection molding. The thickness of the specimen was 6.4 mm. Flexural modulus was evaluated under conditions including a span length of 100 mm, a width of 12.7 mm, and a loading rate of 2.0 mm/min. The measuring temperature was 23° C.

(5) Appearance Evaluation of Foam Molded Article (Silver Streaks)

A region surrounded by a circle of 60 mm in diameter shown in FIG. 1 of a polypropylene resin composition foamed article 3 produced by foaming molding, the region 2 being 100 mm away from the gate portion 1 of the molded article (i.e., the area where silver streaks were evaluated), was visually evaluated and judgment was made according to the following criteria.

◯: No silver streaks in the surface of the foamed article are recognized visually.
Δ: Silver streaks are slightly noticeable.
x: Silver streaks are clearly noticeable.

(6) Evaluation of Foam Molding Property

The expandability of foamed cells and the range of molding conditions in foam molding an obtained foaming polypropylene resin composition were judged as follows.

◯: When a polypropylene resin composition is injected into a mold cavity completely and then a cavity surface of the mold is retracted, a foam molded article expands depending upon the amount of the retraction of the cavity surface. Moreover, even if the time taken before the mold cavity surface is retracted after the completion of the injection of the polypropylene resin composition into the mold cavity is prolonged, a foam molded article expands depending upon the amount of the retraction of the cavity surface.

Δ: If the cavity surface of is retracted, a foam molded article expands.

x: Even if the cavity surface is retracted, a foam molded article does not expand depending upon the amount of the retraction of the cavity surface and therefore the foam molding property is poor.

TABLE 1

| Component | Propylene polymer (A) | | | | | | Ethylene-α-olefin copolymer (B) | | | | | Inorganic filler (C) | | | Organic peroxide (D) | |
|---|---|---|---|---|---|---|---|---|---|---|---|---|---|---|---|---|
| Kind | (A-1) | (A-2)a | (A-2)b | (A-2)c | (A-2)d | (A-2)e | (B-1) | (B-2) | (B-3) | (B-4) | (B-5) | (C-1) | (C-2) | (C-3) | (D-1) | (D-2) |
| Remarks | Propylene homo-polymers | Propylene-ethylene block copolymer [η]$_{EP}$(dl/g) | | | | | MFR (g/10 min) 14.0  35.0  0.2  20.0  1.0 Density (g/cm³) | | | | | | | | | |
| | | 6.0 | 6.0 | 5.0 | 2.8 | 4.0 | 0.878 | 0.863 | 0.860 | 0.905 | 0.858 | — | — | | — | — |

| Experiment No. | The ratio to the total amount of (A), (B) and (C) (% by mass) *: The amount in a masterbatch is provided. | | | | | | | | | | | | | | The incorporated amount (parts by mass) to 100 parts by mass of (A), (B) and (C) in total | |
|---|---|---|---|---|---|---|---|---|---|---|---|---|---|---|---|---|
| Example 1 | 6 | 60 | — | — | — | 3* | 24 | — | — | — | — | 7* | — | — | 0.012 | — |
| Example 2 | 6 | 60 | — | — | — | 3* | — | 24 | — | — | — | 7* | — | — | 0.012 | — |
| Example 3 | — | 66 | — | — | — | — | 13 | — | — | — | — | 10 | 11 | — | — | 0.02 |
| Example 4 | — | 66 | — | — | — | — | 24 | — | — | — | — | — | 10 | — | — | — |
| Example 5 | 15 | — | 51 | — | — | 3* | 24 | — | — | — | — | 7* | — | — | 0.012 | — |
| Example 6 | 25 | — | — | 41 | — | 3* | 24 | — | — | — | — | 7* | — | — | 0.012 | — |
| Example 7 | 33 | — | — | — | 33 | 3* | 24 | — | — | — | — | 7* | — | — | 0.012 | — |
| Example 8 | 11 | 60 | — | — | — | — | 24 | — | — | — | — | — | — | 5* | 0.012 | — |
| Example 9 | 20 | — | 51 | — | — | — | — | 24 | — | — | — | — | — | 5* | — | — |
| Example 10 | 30 | — | — | 41 | — | — | 24 | — | — | — | — | — | — | 5* | 0.012 | — |
| Example 11 | 38 | — | — | — | 33 | — | 24 | — | — | — | — | — | — | 5* | 0.012 | — |
| Comparative Example 1 | 6 | 60 | — | — | — | 3* | — | — | 24 | — | — | 7* | — | — | 0.012 | — |
| Comparative Example 2 | 6 | 60 | — | — | — | 3* | — | — | — | 24 | — | 7* | — | — | 0.012 | — |
| Comparative | 11 | 60 | — | — | — | — | — | — | — | 24 | — | — | — | 5* | 0.012 | — |

TABLE 1-continued

| | Component Kind Remarks Experiment No. | | | | | | | | | | | | | | |
|---|---|---|---|---|---|---|---|---|---|---|---|---|---|---|---|
| Example 3 Comparative Example 4 | 11 | 60 | — | — | — | — | — | — | — | 24 | — | — | — | 5* | 0.012 | — |

| | Item of evaluation | | | | |
|---|---|---|---|---|---|
| Component Kind Remarks Experiment No. | MFR (g/10 min) | Specific gravity | Flexural modulus (MPa) Result of evaluation | Silver streak | Foam molding property |
| Example 1 | 74 | 0.95 | 1380 | ○ | ○ |
| Example 2 | 81 | 0.95 | 1300 | ○ | ○ |
| Example 3 | 87 | 0.97 | 1470 | ○ | ○ |
| Example 4 | 59 | 0.97 | 1430 | ○ | ○ |
| Example 5 | 52 | 0.95 | 1200 | ○ | ○ |
| Example 6 | 50 | 0.95 | 1240 | ○ | ○ |
| Example 7 | 62 | 0.95 | 1280 | ○ | Δ |
| Example 8 | 86 | 0.93 | 1410 | ○ | ○ |
| Example 9 | 56 | 0.92 | 1170 | Δ | ○ |
| Example 10 | 61 | 0.93 | 1310 | ○ | ○ |
| Example 11 | 72 | 0.93 | 1270 | ○ | Δ |
| Comparative Example 1 | 37 | 0.94 | 1280 | X | ○ |
| Comparative Example 2 | 80 | 0.95 | 1410 | X | ○ |
| Comparative Example 3 | 47 | 0.92 | 1320 | X | ○ |
| Comparative Example 4 | 93 | 0.93 | 1470 | Δ | Δ |

INDUSTRIAL APPLICABILITY

According to the present invention, a foam molded article with few silver streaks can be provided.

The invention claimed is:

1. A polypropylene resin composition comprising a propylene polymer (A) containing 0 to 70% by mass of a propylene homopolymer (A-1) and 30 to 100% by mass of a mixture (A-2) of a propylene homopolymer component and a propylene-ethylene random copolymer component, an ethylene-α-olefin copolymer (B) defined below, and an inorganic filler (C), wherein the proportion of the amount of the (A), the proportion of the amount of (B), and the proportion of the amount of (C) relative to the total amount of the (A), the (B) and the (C) are 40 to 94% by mass, 5 to 30% by mass, and 1 to 30% by mass, respectively,
    wherein the intrinsic viscosity, as measured in Tetralin of 135° C., of the propylene-ethylene random copolymer component of the mixture (A-2) is within the range of 6.0 to 8.0 dl/g,
    the ethylene-α-olefin copolymer (B) is a copolymer of ethylene and an α-olefin having 4 to 20 carbon atoms, the copolymer having a density of 0.85 to 0.89 g/cm$^3$ and a melt flow rate, as measured at 190° C. under a 2.16 kg load in accordance with JIS K7210, of more than 10 g/10 min and not more than 40 g/10 min.

2. The polypropylene resin composition according to claim 1, wherein the composition has a melt flow rate, as measured at 230° C. under a 2.16 kg load in accordance with JIS K7210, of 50 to 150 g/10 min.

3. The polypropylene resin composition according to claim 1, wherein the inorganic filler (C) is a fibrous inorganic filler.

4. The polypropylene resin composition according to claim 1, wherein the inorganic filler (C) is fibrous magnesium oxysulfate.

5. A foam molded article formed of the polypropylene resin composition according to claim 1.

6. The foam molded article according to claim 5, wherein the foam molded article is for an automotive component.

7. The polypropylene resin composition according to claim 1, wherein the mixture (A-2) of a propylene homopolymer component and a propylene-ethylene random copolymer component is one prepared by polymerizing propylene to form the propylene homopolymer component and then copolymerizing propylene and ethylene in the presence of the propylene homopolymer component to form the propylene-ethylene random copolymer component.

* * * * *